US012065912B2

(12) United States Patent
Hoffman (10) Patent No.: US 12,065,912 B2
(45) Date of Patent: Aug. 20, 2024

(54) HYDROCARBON FLOW CONTROL GENERATOR SYSTEM

(71) Applicant: Dawson Hoffman, Pittsburgh, PA (US)

(72) Inventor: Dawson Hoffman, Pittsburgh, PA (US)

( * ) Notice: Subject to any disclaimer, the term of this patent is extended or adjusted under 35 U.S.C. 154(b) by 0 days.

(21) Appl. No.: 18/214,767

(22) Filed: Jun. 27, 2023

(65) Prior Publication Data
US 2023/0340860 A1    Oct. 26, 2023

Related U.S. Application Data

(63) Continuation-in-part of application No. 17/016,836, filed on Sep. 10, 2020, now abandoned.

(51) Int. Cl.
*E21B 41/00* (2006.01)
*F01D 15/10* (2006.01)

(52) U.S. Cl.
CPC .......... *E21B 41/0085* (2013.01); *F01D 15/10* (2013.01); *F05D 2220/76* (2013.01)

(58) Field of Classification Search
CPC .......... Y02P 90/50; Y02P 80/20; Y02E 70/30; Y02E 60/16; F02C 6/14; F05D 2220/62
See application file for complete search history.

(56) References Cited

U.S. PATENT DOCUMENTS 3,911,285 A * 10/1975 Yannone ............... F02C 9/32
  322/14
6,825,575 B1   11/2004 Edelson
7,032,499 B2 *  4/2006 Domann ............... E21B 33/08
  166/77.3

(Continued)

FOREIGN PATENT DOCUMENTS

KR  10-2016-0139674 A  12/2016
RU     2 270 396 C1    1/2006

OTHER PUBLICATIONS

Xiao et al., "Well Site Energy Harvesting from High-Pressure Gas Production," *Saudi Aramco Journal of Technology*, Winter 2014 previously provided.

(Continued)

*Primary Examiner* — Thomas E Lazo
(74) *Attorney, Agent, or Firm* — KUSNER & JAFFE (57) ABSTRACT

A hydrocarbon flow control generator system includes a pressurized hydrocarbon flow inlet, an expansion device in pressurized hydrocarbon flow communication with the pressurized hydrocarbon flow inlet, a generator connected to the expansion device, a drive system connecting the generator and the expansion device, a gathering point at which depressurized hydrocarbon stream is delivered to an end use location, and a variable load device via which an electrical power stream generated by the generator is delivered to an electric load. The expansion device is configured to receive a highly pressurized hydrocarbon stream from the pressurized hydrocarbon flow inlet, control and regulate a received hydrocarbon stream, and depressurize the hydrocarbon stream. The variable load device is configured to adjust load on the generator by adjusting electrical demand on the generator based on a pressure of the depressurized hydrocarbon stream sensed between the expansion device and the gathering point.

17 Claims, 4 Drawing Sheets

(56) References Cited

U.S. PATENT DOCUMENTS

| | | | | |
|---|---|---|---|---|
| 7,254,944 B1* | 8/2007 | Goetzinger | ............... | F03D 9/48 |
| | | | | 290/55 |
| 7,608,935 B2* | 10/2009 | Scherzer | ................... | F03G 7/04 |
| | | | | 290/43 |
| 7,958,716 B2* | 6/2011 | Ziegenfuss | ............. | F01D 15/10 |
| | | | | 60/39.465 |
| 8,421,258 B2 | 4/2013 | Pozivil et al. | | |
| 8,596,056 B2* | 12/2013 | Woodmansee | .......... | E21B 33/13 |
| | | | | 60/486 |
| 8,882,438 B2 | 11/2014 | Asti et al. | | |
| 9,217,422 B2* | 12/2015 | Davis | ................... | H02K 7/1823 |
| 9,243,498 B2 | 1/2016 | Oxner | | |
| 10,655,434 B2* | 5/2020 | Weflen | ...................... | F02C 1/02 |
| 2011/0175358 A1 | 7/2011 | Langson | | |
| 2013/0119666 A1* | 5/2013 | Holt | ....................... | F25J 1/0228 |
| | | | | 62/611 |

OTHER PUBLICATIONS

Office Action issued in related U.S. Appl. No. 17/016,836 dated Jan. 31, 2023.

\* cited by examiner

HYDROCARBON FLOW CONTROL GENERATOR SYSTEM

CROSS-REFERENCE TO RELATED APPLICATIONS

This application is a continuation-in-part of U.S. application Ser. No. 17/016,836, filed Sep. 10, 2020, said patent application herein fully incorporated by reference.

FIELD OF THE INVENTION

The present invention relates generally to the field of oil and gas pressure and flow regulation, and, more particularly, a hydrocarbon flow control generator system that generates electricity by capturing energy during the process of regulating pressure and flow of a hydrocarbon producing well.

BACKGROUND OF THE INVENTION

During the lifetime of a hydrocarbon producing well, gases and liquids are received at variable pressures when extracted at the surface for sale. These gases and liquids are often referred to as hydrocarbons.

The hydrocarbon-producing wells can flow extremely high volumes of gas and liquids accompanied with high pressures at the surface. When a well begins to flow, the underground reservoir where the hydrocarbons are located is usually at or near its peak pressure. As the well ages and hydrocarbons are extracted, the pressure and volume decline. For example, newer wells producing shale may have initial pressures up to 11,000 psi while older wells may operate at pressures below 100 psi.

During the early life of well production, wells are often regulated or choked back to control the pressure and flow. This choking of the wells is referred to as managed pressure drawdown. The purpose of managed pressure drawdown is to ensure the high pressures do not damage downstream equipment or cause over pressure events in the pipeline system.

Managed pressure drawdown also allows for a steady volume of hydrocarbons to go to pipeline for sale. Furthermore, evidence shows that allowing a well to free flow during initial production might result in a negative impact on the hydrocarbon productivity of the well through its remaining life.

Historically, managed pressure drawdown is accomplished through the use of regulators, gate valves, or needle valves. These valves and regulators can be any type of device that controls the pressure or flow of the hydrocarbon stream and are often generally referred to as "choke valves." The wellhead pressure gets reduced by the choke valve, which causes an increase in the gas velocity, a reduction in the temperature, and energy loss.

For example, in a conventional example of a needle and seat choke valve, an operator moves the needle closer to the seat by turning the valve. This reduces the space available for the hydrocarbons to travel. An alternative movement of the needle further from the seat creates more space for hydrocarbons to flow and allows for less pressure drop and greater volume.

The energy lost through the choke is significant and can be harvested. Industry has proposed solutions that allow expansion devices or other similar devices to be placed in line of the hydrocarbon flow allowing for the capture of energy. These expansion devices can be coupled to generators that turn gathered energy into electricity. The expansion device and generator principle is based on converting kinetic energy of the gas into useful electric energy.

As the gas flows from the high-pressure stream into the expansion device, the gas rotates the turbine of the expansion device, which, in turn, spins the generator, thereby allowing the generator to produce electricity. In order to maximize the efficiency of the generator the flow of hydrocarbons must be regulated. This is typically accomplished by a control valve or regulator prior to the expansion device. The amount of kinetic energy that can be harvested in the process is proportional to the regulated flow rate and subsequent pressure differential across the expansion device.

The short fall of this process is that the expansion device is a fixed control that has constant resistance on the hydrocarbon flow. As the pressure and flow decrease from the wellhead over the lifetime of the well, resistance applied by the expansion device does not proportionally decrease. Instead, the choke valve upstream of the expansion device must be manually adjusted. Therefore, the control of the pressure and flow of the hydrocarbons is still regulated by the choke valve. This results in a loss of energy at the choke valve. Furthermore, constant adjustment to the choke valve is required.

The present invention provides a hydrocarbon flow control generator system capable of generating electrical energy that overcomes the drawbacks of prior art.

SUMMARY OF THE INVENTION

In accordance with one embodiment of the present invention, there is provided a hydrocarbon flow control generator system. The system includes a pressurized hydrocarbon flow inlet, an expansion device in pressurized hydrocarbon flow communication with the pressurized hydrocarbon flow inlet, a generator connected to the expansion device, a drive system connecting the generator and the expansion device, a gathering point at which depressurized hydrocarbon stream is delivered to an end use location, and a variable load device via which an electrical power stream generated by the generator is delivered to an electric load. The pressurized hydrocarbon flow inlet is configured to receive a hydrocarbon stream at high pressure. The expansion device is configured to receive the highly pressurized hydrocarbon stream from the pressurized hydrocarbon flow inlet, control and regulate the received hydrocarbon stream, and depressurize the hydrocarbon stream. The drive system is configured to transfer mechanical rotational power generated in the expansion device to the generator to drive generation of the electrical power stream by the generator for delivery thereof to the electric load. The mechanical rotation power is generated in the expansion device as a result of the depressurization of the hydrocarbon stream. The variable load device is configured to adjust load on the generator by adjusting electrical demand on the generator based on a pressure of the depressurized hydrocarbon stream sensed between the expansion device and the gathering point.

In another embodiment of the present invention, there is a method of controlling flow of a hydrocarbon stream in a hydrocarbon flow control generator system. A hydrocarbon outlet pressure of the hydrocarbon stream is controlled, via a controller including a processor, at an expansion device connected to a generator through a drive system. The controller including the processor determines if the hydrocarbon outlet pressure at the expansion device must be adjusted in order to meet a predetermined set point of the hydrocarbon outlet pressure. Mechanical rotational power generated in the expansion device from depressurizing of the hydrocarbon stream is transferred to the generator via the drive system to drive generation of an electrical power stream by the generator for delivery thereof to an electric load via a variable load device. The depressurized hydrocarbon stream is gathered at a gathering point to be delivered to an end use location. Load on the generator is adjusted, via the variable load device, by adjusting electrical demand on the generator based on a pressure of the depressurized hydrocarbon stream sensed between the expansion device and the gathering point.

In yet another embodiment of the present invention, there is a method of controlling flow of a hydrocarbon stream in a hydrocarbon flow control generator system. A hydrocarbon outlet pressure of the hydrocarbon stream is controlled via a controller including a processor at an expansion device connected to a generator through a drive system. It is determined, via the controller including the processor, if the hydrocarbon outlet pressure at the expansion device must be adjusted in order to meet a predetermined set point of the hydrocarbon outlet pressure. A variable load device is instructed via the controller including the processor to control a resistive load on a generator to achieve the predetermined set point of the hydrocarbon outlet pressure via the drive system.

An advantage of the present invention is the provision of a hydrocarbon flow control generator system that enables real time adjustments to flow and or pressure of hydrocarbon flow in the field and or remotely.

Another advantage of the present invention is the provision of a hydrocarbon flow control generator system that enables predetermined changes in flow and pressure on a future timeline.

An additional advantage of the present invention is the provision of a hydrocarbon flow control generator system designed to reduce well pad visits and adjustments to instrumentation.

A further advantage of the present invention is the provision of a hydrocarbon flow control generator system including electronic components that generate electricity for sale, storage, or use.

A further advantage of the present invention is the provision of a hydrocarbon flow control generator system including electronic components is that control flow and pressure through electronic manipulation with less wear than mechanical instrumentation.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF THE INVENTION

The present invention will now be described with reference to a hydrocarbon flow control generator (HFCG) system. However, it will be appreciated that the HFGC system of the present invention may also include additional expansion devices, generators, and other electronic devices, including, but not limited to, temperature sensing, volume sensing, moisture sensing, and electrical sensing devices.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Expansion device" refers to one or more devices suitable for reducing the pressure or flow rate of a fluid or gas in a line (for example, a liquid stream, a vapor stream, or a multiphase stream containing both liquid and vapor). Unless a particular type of expansion device is specifically stated, the expansion may be performed at least partially by isenthalpic means, isentropic means, or a combination thereof.

Suitable devices for isenthalpic expansion of natural gas are known in the art and generally include, but are not limited to, manually or automatically actuated throttling devices such as, for example, control valves, Joule-Thomson (J-T) valves, venturi devices, and various other types of valves known to those having ordinary skill in the art to be applicable in such situations. Suitable devices for isentropic expansion of natural gas are known in the art. Generally, they include equipment such as expansion devices or turbo expansion devices that extract or derive work from such expansion.

Suitable devices for isentropic expansion of liquid streams are known in the art. Generally, they include equipment such as expansion devices, hydraulic expansion devices, expansion devices, or turbo expansion devices that extract or derive work from such expansion.

An example of a combination of both isentropic means and isenthalpic means may be a Joule-Thomson (J-T) valve and a turbo expansion device in parallel, which provides the capability of using the J-T valve alone, the turbo expansion device alone, or the J-T valve and the turbo expansion device in combination simultaneously. Isenthalpic or isentropic expansion can be conducted in the all-liquid phase, all-vapor phase, or mixed phases, and can be conducted to facilitate a phase change from a vapor stream or liquid stream to a multiphase stream (a stream having both vapor and liquid phases).

"Expansion-type cooling" refers to cooling that occurs when the pressure of a gas, liquid, or two-phase system is decreased by passage through a pressure reduction means. In one embodiment, the expansion means is a Joule-Thompson expansion valve. In another embodiment, the expansion means is a hydraulic or gas expansion device, such as a turbo-expansion device.

As used herein, a "heat exchange unit" includes any one type or combination of similar or different types of equipment known in the art for facilitating heat transfer. Thus, a heat exchange unit may be a single piece of equipment, or it may comprise equipment contained in a plurality of equipment pieces. Conversely, multiple heat exchange units may be contained in a single piece of equipment, for example, a cooling box containing multiple heat exchangers.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

A "hydrocarbon" is an organic compound that primarily includes the elements hydrogen and carbon, nitrogen, sulfur, oxygen, metals, or any number of other elements may be present in small amounts. As used herein, hydrocarbons generally refer to components found in raw natural gas, such as $CH_4$, $C_2 H_2$, $C_2 H_4$, $C_2 H_6$, C3 isomers, C4 isomers, benzene, and the like.

The term "natural gas" refers to a multi-component gas obtained from a hydrocarbon well (associated gas). The composition and pressure of natural gas can vary significantly. A typical natural gas stream contains methane (C1) as a significant component. Raw natural gas may often contain ethane (C2), higher molecular weight hydrocarbons, one or more acid gases (such as carbon dioxide, hydrogen sulfide, carbonyl sulfide, carbon disulfide, and mercaptans), and minor amounts of contaminants such as water, nitrogen, iron sulfide, wax, and crude oil.

"Pressure" is the force exerted per unit area by the gas on the walls of the volume. "Atmospheric pressure" refers to the local pressure of the air. "Absolute pressure" refers to the sum of the atmospheric pressure (14.7 psia at standard conditions) plus the gage pressure (psig). "Gauge pressure" refers to the pressure measured by a gauge, which indicates only the pressure exceeding the local atmospheric pressure. The term "vapor pressure" has the usual thermodynamic meaning. For a pure component in an enclosed system at a given pressure, the component vapor pressure is essentially equal to the total pressure in the system.

"Substantial" when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

Figure 1:
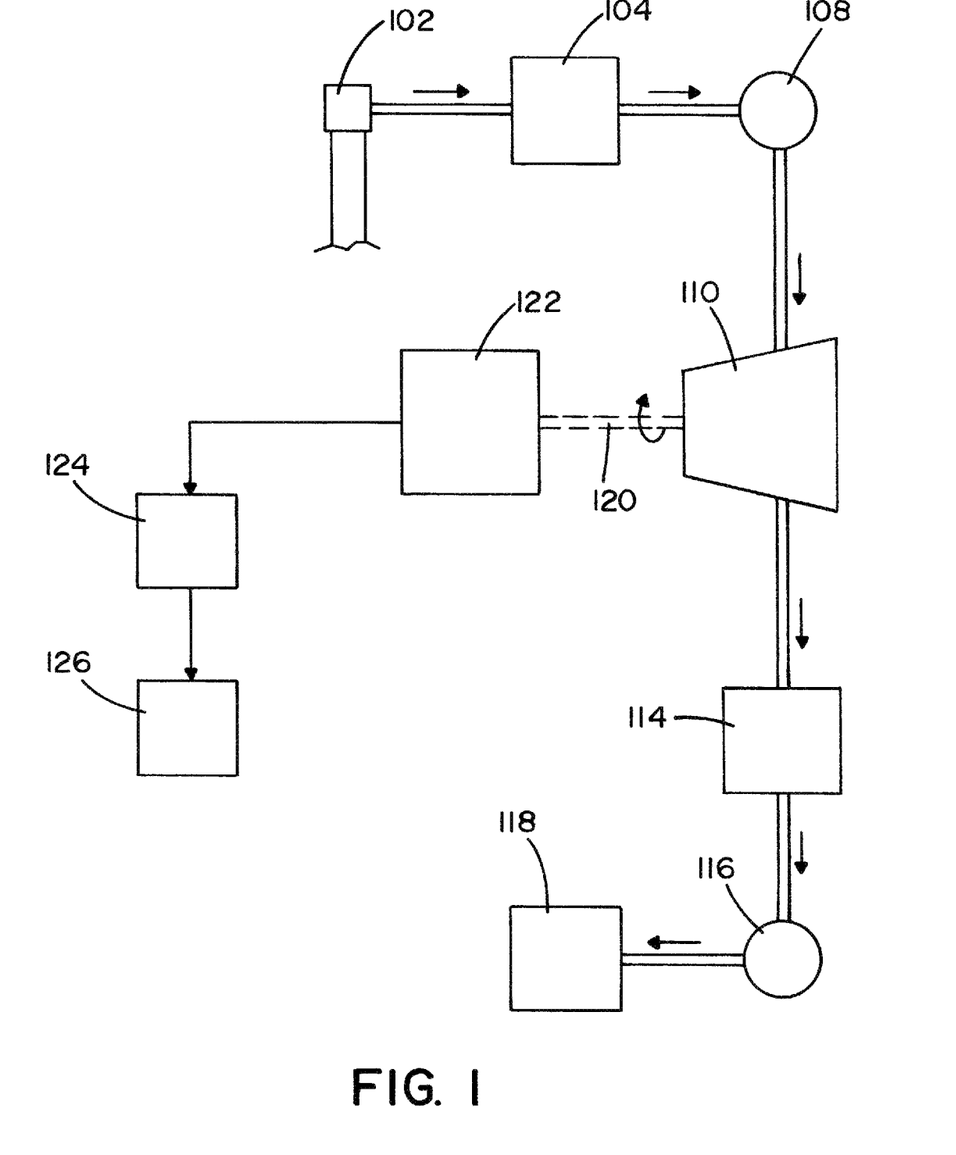
FIG. 1 is a block diagram illustrating an example of a hydrocarbon flow control generator system according to an embodiment of the present invention.

Referring now to the drawings wherein the showing are for the purposes of illustrating embodiments of the invention only and not for the purposes of limiting same, FIG. 1 is a block diagram illustrating an example of a HFGC system 100 that uses an expansion device 110 and a generator 122 for recovering power as hydrocarbons are depressurized. As shown in FIG. 1, a hydrocarbon stream, such as a raw gas feed, may enter the HFGC system 100 through a pressurized hydrocarbon flow inlet 102 configured to receive the hydrocarbon stream. The hydrocarbon stream may emanate from a hydrocarbon wellhead or any other feed source known to those having ordinary skill in the art as providing a raw gas feed similar to a hydrocarbon wellhead.

In one example, the hydrocarbon stream, especially in the case of a raw gas feed, may then be sent through a treatment process 104 that may remove contaminants, water, heavier hydrocarbons (such as ethane, ethylene, C3 isomers, and higher carbon compounds), and other impurities from the raw gas feed, thereby resulting in production of a treated hydrocarbon stream. The methods used to remove contaminants may include filtration, dehydration, liquid separation or any other method know to those ordinary skill in the art.

The treated hydrocarbon stream flows from the treatment process 104 to the expansion device 110 through inlet sensors 108. The inlet sensors 108 may sense various attributes of the treated hydrocarbon stream, such as, but not limited to, pressure, flow rate, or temperature.

After passing through the inlet sensors 108, the treated hydrocarbon stream is controlled and regulated in an expansion device 110, which is in pressurized flow communication with all the upstream components, including the pressurized hydrocarbon flow inlet 102. The highly pressurized hydrocarbon stream is expanded and depressurized within the expansion device 110 prior to exiting the expansion device 110. The expansion device 110 may be any device known to those having ordinary skill in the art as being able to receive the treated hydrocarbon stream at high pressure, depressurize the hydrocarbon stream therewithin, and exit the expansion device at a lower pressure, such as, but not limited to, an expander or a turbine.

After exiting the expansion device 110, a portion of or the entire expanded, depressurized hydrocarbon stream may be fed directly to and received by a heat exchanger 114 to be passed therethrough for providing expansion-type cooling to a cooling fluid that may carry heat from the heat-generating elements of the HFGC system 100. These elements include the expansion device 110 and the generator 122, which will be further described in detail below.

After passing through the heat exchanger 114 and on the way to a gathering point 118, outlet sensors 116 may process pressure, flow rate, temperature and other attributes of the depressurized hydrocarbon stream. The gathering point 118 is a point at which the depressurized hydrocarbon stream may be delivered to an end use location, such as a pipeline. The gathering point 118 may be a holding vessel or may be a direct passageway to a pipeline.

A generator 122 is connected to the expansion device 110 through a drive system 120. The pressurized hydrocarbon stream is depressurized in the expansion device 110 to generate mechanical power that causes the drive system 120 to rotate. This mechanical/rotational power from the rotating drive system 120 subsequently drives rotation of the generator 122 to generate electrical power. As previously noted, the depressurized hydrocarbon stream may then be discharged from the expansion device 110 to a heat exchanger 114.

In accordance with one embodiment of the invention, the drive system 120 may involve housing the expansion device 110 and generator 122 in a common casing, known in the refrigeration industry as semi-hermetic construction. As is well known, semi-hermetic construction is a technique that is employed with compressors (particularly for refrigeration) in which the motor (or generator 122) and compressor (or expansion device 110) share common pressure housing. Since the generator 122 and expansion device 110 are directly coupled via the drive system 120 that does not pass through the atmosphere, shaft seals are typically not needed. Thus, there are typically no rotating seals to leak, nor moving belts, pulleys or gears to generate static or sparks. For flammable gases in particular, this type of construction method obviates the need for a shaft seal and external moving parts.

The drive system 120 in FIG. 1 may be, but is not limited to, a belt drive, a drive shaft, direct drive, a gear train, a magnetic coupling, or any other method or device that one having ordinary skill in the art would find to be suitable to achieve the desired end result of transfer of mechanical rotational power generated in the expansion device 110 to the generator 122.

As illustrated in FIG. 1, an electrical power stream generated by the generator 122 is delivered to an electric load 126 via a variable load device 124. The variable load device 124 is a controller implemented through use of a processor, and may be a rectification load device, DC-DC converter (Buck-Boost) load device, load controller feedback loop, or any other similar device capable of varying resistive load. The use of the variable load device 124 allows the rotational speed of the generator 122 and connected expansion device 110 to be adjusted to optimize electrical power production or system operation. The variable load device 124 adjusts the current the generator 122 is required to produce in order to flow electricity of a certain voltage to the load. This in turn affects the rotational speed of the generator 122, allowing the electrical load 126, to be varied through a controller 130 to control the flow, pressure, or other attributes of the hydrocarbon stream passing through the expansion device. When more pressure regulation is required, the variable load device 124 will add more electrical load. When less pressure regulation is required, the variable load device 124 will lessen electrical load as needed.

In this way, the HFGC system's expander-generator system acts as an eddy brake or a similar mechanism known by one having ordinary skill in the art, in which the expansion device 110 provides mechanical energy to the generator 122 in the form of torque and speed. In this case, the expansion device 110 is capturing the kinetic energy due to the hydrocarbon pressure drop. The two-part system turns at a fixed speed relation depending on the torque provided by the expansion device 110 and the torque the generator 122 absorbs.

The term "torque load" refers to the amount of torque the generator 122 absorbs from the expansion device 110. Torque load can be variable. The torque supplied by the expansion device 110 and the torque load are not always at equilibrium in the system. If the torque supplied by the expansion device 110 is in excess of the torque load, the speed of the system will increase until either an equilibrium point is reached, or a system failure occurs. As the speed of the system becomes high enough, the generator 122 begins to generate electricity and absorbs the torque produced by the expansion device 110, and torque load increases. There is at least one equilibrium point at which the torque output of the expansion device 110 matches the torque load, whereupon the system ceases acceleration, and a steady speed is maintained. When the torque load is negative, the generator 122 acts as a motor and supplies torque in the direction of the expansion device 110 via rotation of the drive system 120.

The speed of the system can be manipulated by altering the relationship between the generator's 122 torque requirements and its speed. When the torque requirements are altered, the expander/generator equilibrium is changed, and the system moves to a new speed. The manipulation of the generator's 122 torque/speed characteristics can be done by utilizing a changeable load on the generator 122. When using a changeable load, the load can be made to draw more or less current from the generator 122. This will increase or decrease the torque load and excitation magnitude of the generator 122. The excitation magnitude sets the strength of the magnetic field in the generator 122 and, thus, the voltage output at a particular RPM. Furthermore, the change in voltage of the excitation produce different torque load characteristics of the generator 122.

The variable load device 124 is configured to control rotation of the generator 122, the drive system 120, and expansion device 110. As an example, using a varying load provided by the variable load device 124, a DC generator may be used to supply a resistance to the hydrocarbon stream. The pressure drop across the expansion device 110 produces a mechanical power output. This mechanical power is converted by the generator 122 into electrical power. The electrical power is fed to the variable load device 124, where it is dissipated to the electric load 126 or other power draw. If the pressure after the expansion device 110 needs to decrease, the expansion device 110 is required to put more restriction on the flow of the hydrocarbon stream by slowing in rotation. In order to slow the rotation of the expansion device 110, the torque load of the generator 122 is increased through the utilization of the variable load device 124, which switches in a larger amount of the electric load 126 to the generator 122. This also increases the power output of the generator 122 and current flowing to the electric load 126. When the torque load of the generator 122 is increased, it causes the torque of the system to fall out of equilibrium. The torque of the expansion device 110 becomes lower than the torque load of the generator 122. The speed of the expansion device 110 decreases to increased torque requirements.

Unlike a variable load device 124 a variable frequency device or VFD is a motor controller used in industry primarily for speed control of induction motors. Its working principle is that it takes in power, rectifies it to DC, and makes AC from the DC at varying frequencies to control the motor's speed. A variable load device 124 is a generic term with multiple implementations available that varies load depending on either a user defined value (open loop) or a control feedback (closed loop) to make either torque or speed constant on a generator. A VFD can not be used to control the speed of a generator.

The generator 122 is not limited to operation with a variable load device 124. In another embodiment, the expansion device 110 is operated in a fixed speed mode where the generator 122 is directly connected to the electric load 126. This may be useful for maintaining operation in case of a failure of the variable load device 124.

Figure 2:
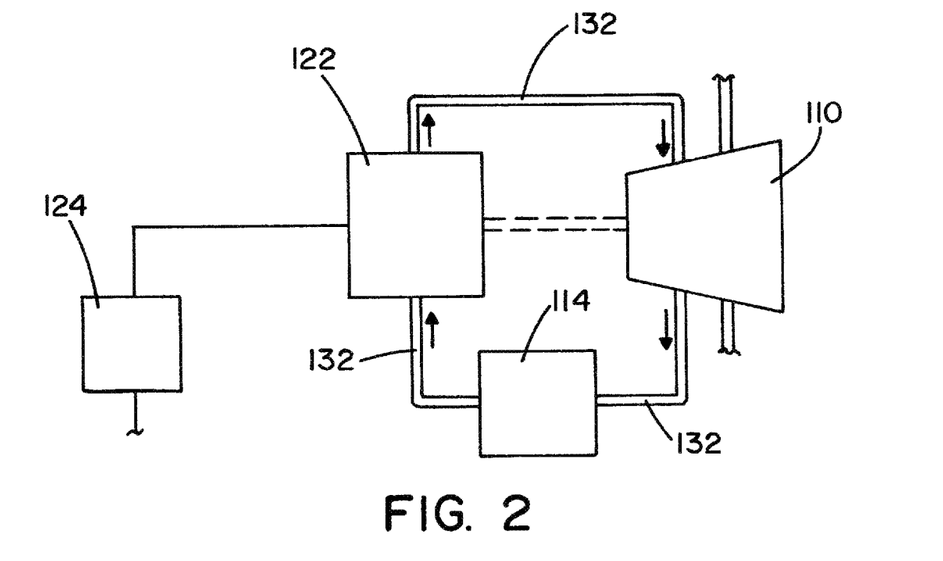
FIG. 2 is a block diagram illustrating an example of the heat exchange process of the hydrocarbon flow control generator system according to an embodiment of the present invention.

The heat exchange fluid loop 132 is shown in FIG. 2 as a block diagram. The fluid cooled in the heat exchanger 114 may resultantly flow through the generator 122, the drive system 120, the expansion device 110, and back to the heat exchanger 114. This process allows the cooling fluid to capture heat and carry it to the heat exchanger 114, where it can be cooled again by direct or indirect heat exchange. The heat exchanger 114 may use water, oil, or air as the cooling fluid, although any type of fluid can be used that is known by those having ordinary skill in the art to be suitable for this application. The temperature of the fluid as it emerges from the heat exchanger 114 depends on the ambient conditions and the cooling medium used. The temperature may be in a range from about 35° F. to about 200° F. The cooled heat exchange fluid can then return to the generator 122, the shaft 120, and the expansion device 110 where it can gather waste heat in order to cool the equipment.

Figure 3:
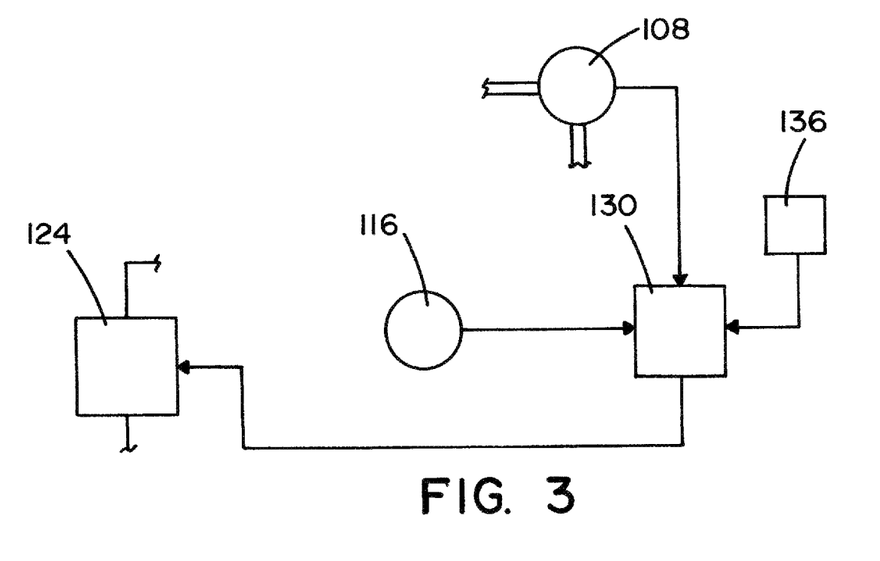
FIG. 3 is a block diagram illustrating an example of the control system of the hydrocarbon flow control generator system according to an embodiment of the present invention.

The electrical generation and control of the HFGC system 100 is shown in FIG. 3 as a block diagram representing a control system 300. The basic components of the HFGC system control system 300 include sensors 108 & 116, a controller 130, and the ability to adjust instrumentation associated with the HFGC system 100 and the hydrocarbon streams. In order to perform the prescribed functions and desired processing, as well as the computations therefore (e.g., execution control algorithm(s), the control processes prescribed herein, and the like), the control system 300 may include, but is not be limited to, a processor(s), computer(s), memory, storage, register(s), timing, interrupt(s), communication interface(s), transducers(s), and input/output signal interface(s). Any one of these features may be incorporated into the controller 130. In accordance with an exemplary embodiment, the processing of the method of FIG. 1 may be implemented by a controller 130 disposed internally, externally, or internally and externally the HFGC system 100.

Any number of technologies may be used in the various sensors 108 & 116, as would be known in the art. For example, the pressure transmitters may include strain gauge and thin film technologies, among others. The temperature transmitters may include thermocouples, resistance temperature detectors, and the like. The flow transmitters may include orifice meters, mass flow meters, and the like. The vibration transmitters may include an accelerometer, a velocimeter, or a proximity probe, among others.

The controller 130 may include any number of different unit control systems or computers, including, for example, a distributed control system (DCS), a direct digital controller (DDC), a programmable logic controller (PLC), and any number of similar units. In an embodiment, the controller 130 is contained within a plant wide DCS. Appropriate DCS units may be any known to those having ordinary skill in the art to be able to provide the necessary control to the system. The controller 130 includes at least one processor including at least one processor element, which may be contained in any primary or subsidiary element thereof. Such processing elements may include the above-referenced unit control systems or computers, but are not limited thereto and may further include an array of logic gates, a plurality of slave controllers, an arithmetic logic unit, a digital signal processor, a microcomputer, a programmable logic controller, a field programmable gate array, a programmable logic array, a microprocessor, or any other device or combination of devices known to one having ordinary skill in the art to be capable of responding to and executing instructions in a defined manner to achieve a desired result.

As shown in FIG. 3, one input to the controller 130 is a group of set points 136. The set points 136 are dictated by process requirements and may be primarily governed by HFGC system throughput, hydrocarbon pressure drop, electricity generation, generator rotational speed, hydrocarbon flow rate or the like. The set points 136 are used as inputs to control laws, which may be operable in the controller 130. The process control laws are the mathematical relationships between the set points 136 and the actual control inputs from sensors 108 & 116 used to effect the set points 136 in the HFGC system 100. The control inputs from sensors 108 & 116 and the variable load device 124 are inputs to the controllable components of the HFGC system 100. For example, a control law may state how much a set of control inputs from sensors 108 & 116 and the variable load device 124 should be changed to achieve a selected pressure drop in the depressurized hydrocarbon stream. The control outputs from the controller 130 may include the opening or closing of process flow valves, the coupling of the generator 122 to the expansion device 110, the resistance of the generator 122, and the like. The controller 130 could accomplish at least some of these goals by controlling the variable load device 124 through the control outputs.

Figure 4:
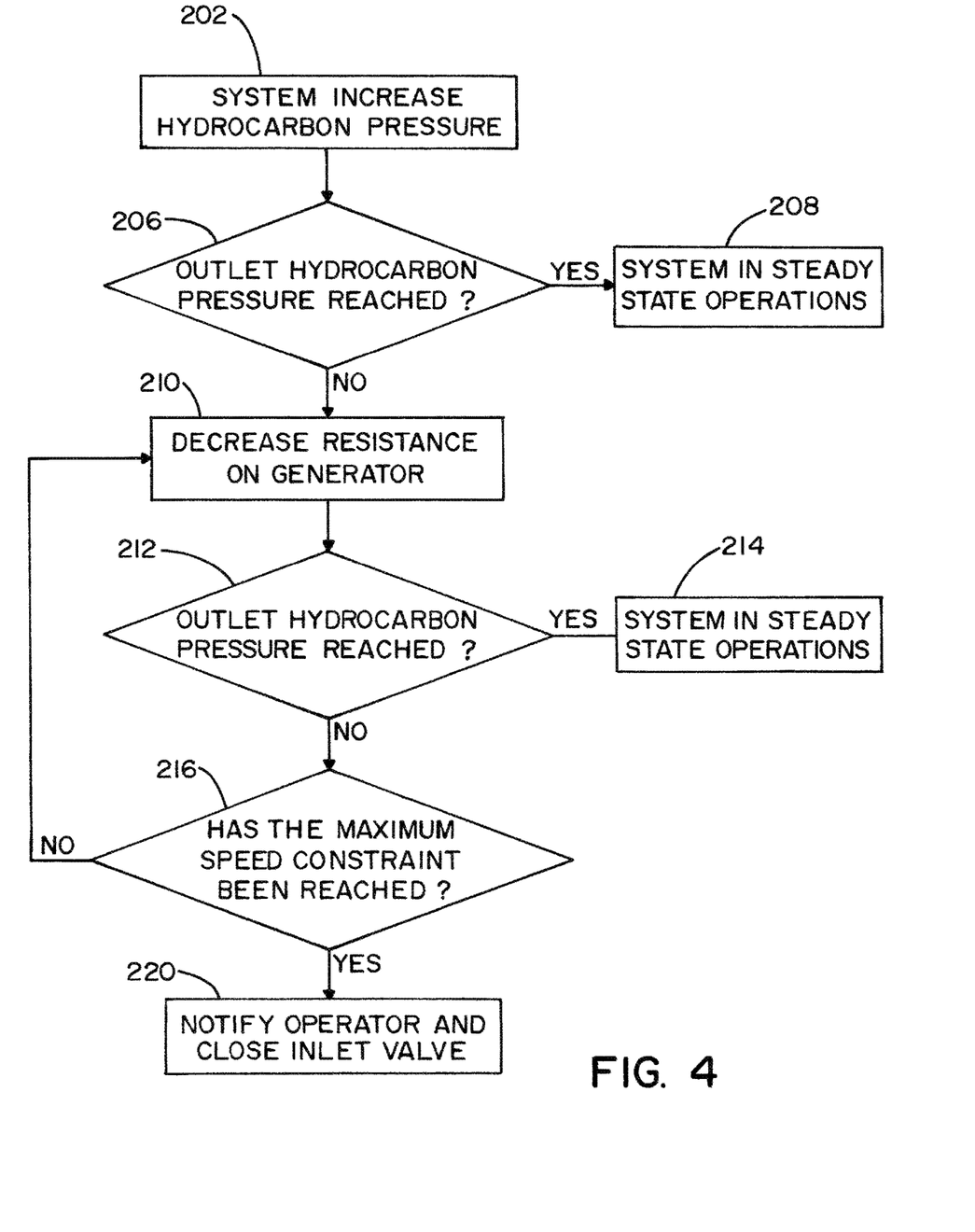
FIG. 4 is a process flow diagram illustrating an example of a method of controlling the flow of hydrocarbons from a well with the hydrocarbon flow control generator system according to an embodiment of the present invention.
Figure 5:
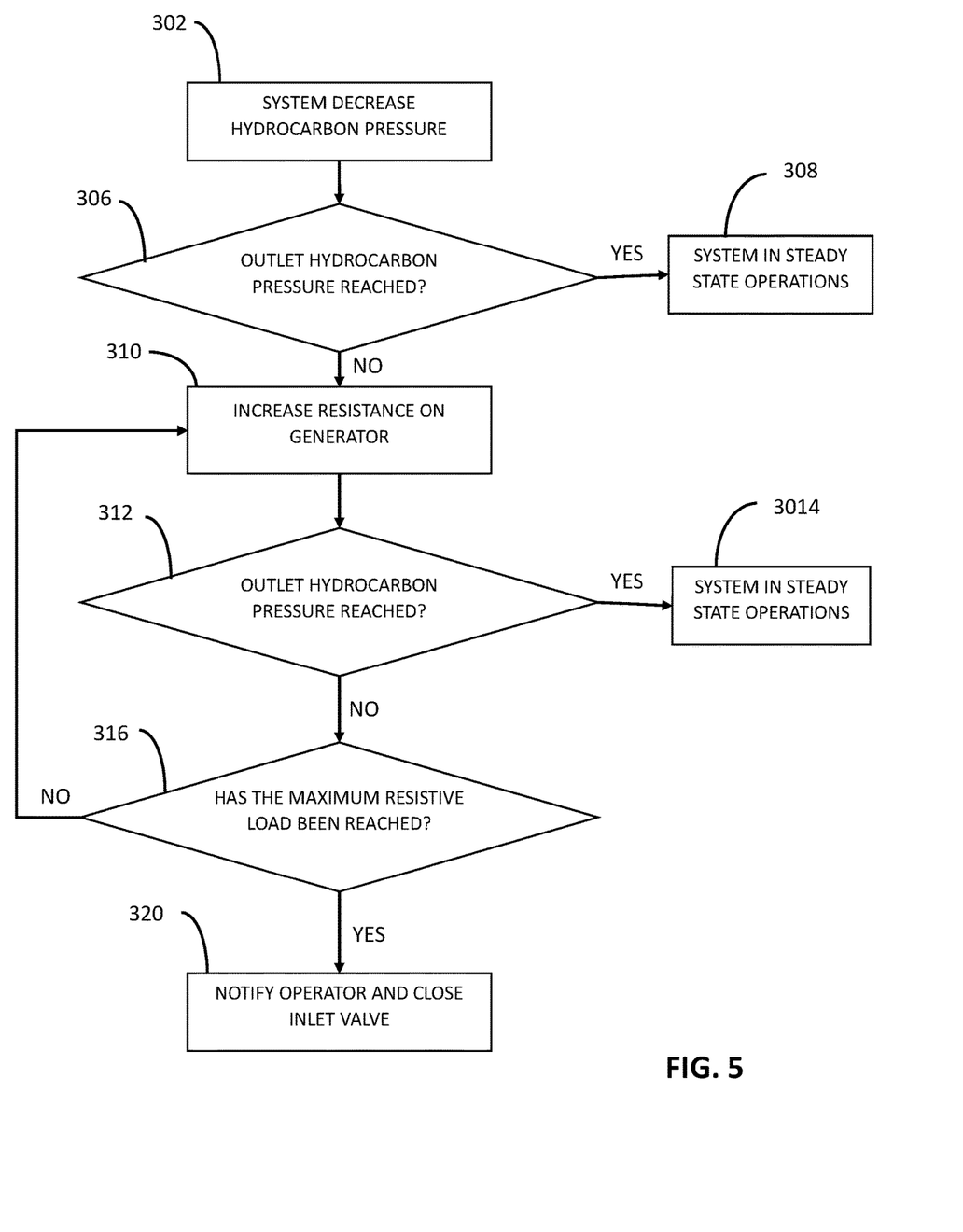
FIG. 5 is a process flow diagram illustrating another example of a method of controlling the flow of hydrocarbons from a well with the hydrocarbon flow control generator system according to an embodiment of the present invention.

FIG. 4 is a process flow diagram showing a method 400 for the HFGC system 100 adjusting the hydrocarbon stream pressure emanating from a flow source and entering the pressurized hydrocarbon flow inlet 102. FIG. 5 is a process flow diagram showing a method 500 for the HFGC system 100 adjusting the hydrocarbon stream pressure emanating from a flow source and entering the pressurized hydrocarbon flow inlet 102.

The goal of the pressure control is to adjust the depressurized hydrocarbon stream at the outlet of the expansion device 110 to a determined set point 136 that may follow managed pressure drawdown procedures. To effect outlet pressure, the controller 130 monitors the inlet and outlet pressures of the expansion device as well as other attributes such as temperature, flow, and rotational speed via control inputs provided by sensors 108 & 116 and the variable load device 124. Based on the values recited via control inputs, the controller 130 adjusts the rotational speed of the generator 122 and the expansion device 110 through the variable load device 124 according to control outputs sent from the controller 130.

The method 400 begins prior to block 202 with the plant system at steady state. At block 202, a set point 132 tells the controller 130 to increase hydrocarbon outlet pressure within the system. At block 206, the controller 130 receives the outlet pressure value from the outlet sensor 116 and determines if the outlet pressure at the expansion device 110 must be changed in order to meet the desired set point 132.

If it is determined that the outlet pressure at the expansion device 110 does not meet the desired set point 132, the outlet pressure at the expansion device 110 must be adjusted. In order to adjust the outlet pressure at the expansion device 110, at block 210, the controller 130 may decrease resistive load on the generator 122 through the variable load device 124 by instructing the variable load device 124 to do so via control outputs. This will speed up the rotational speed of the expansion device 110 and generator 122. In turn, the new rotational speed of the expansion device 110 will allow more hydrocarbon to pass through with less pressure drop.

If the outlet pressure at the expansion device 110 meets the desired set point 132, it is determined at block 208 that the system is in steady state operations. The controller 130 holds the rotational speed and returns to steady state.

After block 210, at block 212, the controller 130 receives the outlet pressure value from the outlet sensor 116 and again determines if the outlet pressure at the expansion device 110 must be changed in order to meet the desired set point 132. As was the case at block 206, at block 212, if the outlet pressure at the expansion device 110 meets the desired set point 132, it is determined at block 214 that the system is in steady state operations. The controller 130 holds the rotational speed and returns to steady state.

On the other hand, if, at block 212, it is again determined that the outlet pressure at the expansion device 110 does not meet the desired set point 132, it is then determined at block 216 if the maximum speed constraint has been reached as a result of the decreased resistance on the generator 124. More specifically, the controller 130 of the HFGC system 100 will continue to adjust the rotational speed until the desired outlet pressure has been released. This is evidenced by the loop illustrated in FIG. 4 between blocks 210, 212, and 216. However, this loop requires a failsafe determination as to whether the resistance applied to the generator 122 has been decreased to the extent that the generator 124 is rotating at a speed that will result in excess hydrocarbon flow or a run away event. If, at block 216, it is determined that the maximum speed constraint of the generator 122 or the expansion device 110 has been reached without achieving the desire outlet pressure, then, at block 220, the controller 130 will stop adjusting the rotational speed, notify an operator of the issue, and close the valve associated within the flow inlet 102 to prevent any further hydrocarbon flow or a run away event.

The method 500 begins prior to block 302 with the plant system at steady state. At block 302, a set point 132 tells the controller 130 to decrease hydrocarbon outlet pressure within the system. At block 306, the controller 130 receives the outlet pressure value from the outlet sensor 116 and determines if the outlet pressure at the expansion device 110 must be changed in order to meet the desired set point 132.

If it is determined that the outlet pressure at the expansion device 110 does not meet the desired set point 132, the outlet pressure at the expansion device 110 must be adjusted. In order to adjust the outlet pressure at the expansion device 110, at block 310, the controller 130 may increase resistive load on the generator 122 through the variable load device 124 by instructing the variable load device 124 to do so via control outputs. This will slow down the rotational speed of the expansion device 110 and generator 122. In turn, the new rotational speed of the expansion device 110 will allow less hydrocarbon to pass through with more pressure drop.

If the outlet pressure at the expansion device 110 meets the desired set point 132, it is determined at block 308 that the system is in steady state operations. The controller 130 holds the rotational speed and returns to steady state.

After block 310, at block 312, the controller 130 receives the outlet pressure value from the outlet sensor 116 and again determines if the outlet pressure at the expansion device 110 must be changed in order to meet the desired set point 132. As was the case at block 306, at block 312, if the outlet pressure at the expansion device 110 meets the desired set point 132, it is determined at block 314 that the system is in steady state operations. The controller 130 holds the rotational speed and returns to steady state.

On the other hand, if, at block 312, it is again determined that the outlet pressure at the expansion device 110 does not meet the desired set point 132, it is then determined at block 316 if the maximum resistive load constraint has been reached as a result of the increased resistance on the generator 124. More specifically, the controller 130 of the HFGC system 100 will continue to adjust the rotational speed until the desired outlet pressure has been released. This is evidenced by the loop illustrated in FIG. 5 between blocks 310, 312, and 316. However, this loop requires a failsafe determination as to whether the resistance applied to the generator 122 has been increased to the extent that there is no additional resistance to be applied that will result in excess hydrocarbon flow or a run away event. If, at block 316, it is determined that the maximum resistive load constraint has been reached without achieving the desire outlet pressure, then, at block 320, the controller 130 will stop adjusting the rotational speed, notify an operator of the issue, and close the valve associated within the flow inlet 102 to prevent any further hydrocarbon flow or a run away event.

While the adjustment parameter respectively illustrated in FIGS. 4 and 5 and the methods 400 and 500 is related to rotational speed of the generator 122 and the expansion device 110 because of the resistance provided by the variable load device 124, embodiments described herein are not limited thereto. A constraint regulation can be a maximum generator speed, system high heat level, loss of electricity generation, or any other constraint. In any case, the controller 130 determines the appropriate procedure for the constraint regulation.

In another embodiment, in certain situations, the controller 130 may be programmed to isolate the HFGC system 100 and bypass it completely. Alternatively, the controller 130 may inhibit a raw gas feed from entering the pressurized hydrocarbon flow inlet 102. For example, the controller 130 may close a main valve at the feed source or a valve between the feed source and the pressurized hydrocarbon flow inlet 102 until the problem is resolved. The controller 130 may also emit other audible or visual alarms.

The present techniques are not limited to the configurations discussed above. While the present techniques may be susceptible to various modifications and alternative forms, the exemplary embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

Having described the invention, the following is claimed:

1. A hydrocarbon flow control generator system, comprising:
   a pressurized hydrocarbon flow inlet configured to receive a hydrocarbon stream at high pressure;
   an expansion device in pressurized hydrocarbon flow communication with the pressurized hydrocarbon flow inlet, the expansion device being configured to receive the highly pressurized hydrocarbon stream from the pressurized hydrocarbon flow inlet, control and regulate the received hydrocarbon stream, and depressurize the hydrocarbon stream;
   a generator connected to the expansion device;
   a drive system connecting the generator and the expansion device, the drive system being configured to transfer mechanical rotational power generated in the expansion device to the generator to drive generation of an electrical power stream by the generator for delivery thereof to an electric load, the mechanical rotational power being generated in the expansion device as a result of the depressurization of the hydrocarbon stream;
   a gathering point at which the depressurized hydrocarbon stream is delivered to an end use location; and
   a variable load device via which the electrical power stream generated by the generator is delivered to the electric load, the variable load device being configured to adjust load on the generator by adjusting electrical demand on the generator based on a pressure of the depressurized hydrocarbon stream sensed between the expansion device and the gathering point.

2. The system according to claim 1, wherein the drive system is further configured to rotate on account of the mechanical rotational power generated in the expansion device and transferred to the drive system.

3. The system according to claim 2, wherein the generator is configured to rotate on account of the mechanical rotational power transferred to the drive system.

4. The system according to claim 1, further comprising:
a heat exchanger positioned between the expansion device and the gathering point, the heat exchanger being configured to receive the depressurized hydrocarbon stream and allow the depressurized hydrocarbon stream to cool a cooling fluid that carries heat from the expansion device and the generator to the heat exchanger.

5. The system according to claim 4, further comprising:
inlet sensors configured to sense one or more of pressure, temperature, and flow rate of the hydrocarbon stream at a position between the pressurized hydrocarbon flow inlet and the expansion device;
outlet sensors configured to sense one or more of pressure, temperature, and flow rate of the depressurized hydrocarbon stream between the heat exchanger and the gathering point.

6. The system according to claim 1, wherein the variable load device is further configured to adjust rotational speeds of the generator and the expansion device to control passage of the hydrocarbon stream through the expansion device.

7. The system according to claim 1, wherein the load on the generator is a resistive load.

8. The system according to claim 1, wherein the load supplied by the variable load device controls rotation of the generator, the drive system, and the expansion device.

9. The system according to claim 1, further comprising:
a control system, comprising:
inlet sensors configured to sense one or more of pressure, temperature, and flow rate of the hydrocarbon stream at a position between the pressurized hydrocarbon flow inlet and the expansion device;
outlet sensors configured to sense one or more of pressure, temperature, and flow rate of the depressurized hydrocarbon stream between the gathering point and a heat exchanger positioned between the expansion device and the gathering point, the heat exchanger being configured to receive the depressurized hydrocarbon stream and allow the depressurized hydrocarbon stream to cool a cooling fluid that carries heat from the expansion device and the generator to the heat exchanger; and
a controller having a processor configured to control the load device according to data collected by the inlet and outlet sensors and set points inputted into the controller.

10. A method of controlling flow of a hydrocarbon stream in a hydrocarbon flow control generator system, the method comprising:
controlling, via a controller including a processor, a hydrocarbon outlet pressure of the hydrocarbon stream at an expansion device connected to a generator through a drive system;
determining, via the controller including the processor, if the hydrocarbon outlet pressure at the expansion device must be adjusted in order to meet a predetermined set point of the hydrocarbon outlet pressure;
transferring mechanical rotational power generated in the expansion device from depressurizing of the hydrocarbon stream to the generator via the drive system to drive generation of an electrical power stream by the generator for delivery thereof to an electric load via a variable load device;
gathering the depressurized hydrocarbon stream at a gathering point to be delivered to an end use location; and
adjusting, via the variable load device, load on the generator by adjusting electrical demand on the generator based on a pressure of the depressurized hydrocarbon stream sensed between the expansion device and the gathering point.

11. The method according to claim 10, wherein the generated mechanical rotational power rotates the drive system.

12. The method according to claim 10, further comprising, after the depressurizing of the hydrocarbon stream and before the gathering of the depressurized hydrocarbon stream;
allowing the depressurized hydrocarbon stream, via a heat exchanger, to cool a cooling fluid that carried heat from the expansion device and the generator to the heat exchanger.

13. The method according to claim 10, further comprising:
before the depressurizing of the hydrocarbon stream, first sensing one or more of pressure, temperature, and flow rate of the hydrocarbon stream at a position between the pressurized hydrocarbon flow inlet and the expansion device;
second sensing one or more of pressure, temperature, and flow rate of the depressurized hydrocarbon steam between the gathering point and a heat exchanger positioned between the expansion device and the gathering point, the heat exchanger being configured to receive the depressurized hydrocarbon stream and allow the depressurized hydrocarbon stream to cool a cooling fluid that carries heat from the expansion device and the generator to the heat exchanger; and
controlling, via the processor of the controller, the variable load device according to data collected by the first sensing and the second sensing and set points inputted into the controller.

14. A method of controlling flow of a hydrocarbon stream in a hydrocarbon flow control generator system, the method comprising:
controlling, via a controller including a processor, a hydrocarbon outlet pressure of the hydrocarbon stream at an expansion device connected to a generator through a drive system;
determining, via the controller including the processor, if the hydrocarbon outlet pressure at the expansion device must be adjusted in order to meet a predetermined set point of the hydrocarbon outlet pressure; and
instructing, via the controller including the processor, a variable load device to control a resistive load on a generator to achieve the predetermined set point of the hydrocarbon outlet pressure via the drive system.

15. The method according to claim 14, wherein the determining further comprises sensing the hydrocarbon outlet pressure of the hydrocarbon stream after the hydrocarbon stream is depressurized at the expansion device, and
wherein the instructing is performed based on the sensed hydrocarbon outlet pressure.

16. The method according to claim 14, wherein the controller instructs an inlet valve to cease the flow of the hydrocarbon stream when the resistive load on the generator decreases to an extent at which a maximum rotational speed of the generator is reached without achieving the predetermined set point of the hydrocarbon outlet pressure.

17. The method according to claim 14, wherein the controller instructs an inlet valve to cease the flow of the hydrocarbon stream when the resistive load on the generator increases to an extent at which a maximum resistive load is reached without achieving the predetermined set point of the hydrocarbon outlet pressure.

* * * * *